(12) United States Patent
Hayashi et al.

(10) Patent No.: US 7,976,751 B2
(45) Date of Patent: Jul. 12, 2011

(54) EXPANDED POROUS POLYTETRAFLUOROETHYLENE FILM HAVING ELASTIC RECOVERY PROPERTY IN THICKNESS-WISE DIRECTION OF THE FILM, PRODUCTION PROCESS THEREOF, AND USE OF THE POROUS FILM

(75) Inventors: Fumihiro Hayashi, Osaka (JP); Yasuhiro Okuda, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 107 days.

(21) Appl. No.: 12/388,555

(22) Filed: Feb. 19, 2009

(65) Prior Publication Data

US 2009/0159190 A1   Jun. 25, 2009

Related U.S. Application Data

(62) Division of application No. 10/587,281, filed as application No. PCT/JP2005/007198 on Apr. 7, 2005, now abandoned.

(30) Foreign Application Priority Data

Apr. 7, 2004   (JP) .................. 2004-112659

(51) Int. Cl.
  *B29C 47/00*   (2006.01)
(52) U.S. Cl. .................. 264/127; 264/210.1
(58) Field of Classification Search .................. 264/127, 264/210.1
  See application file for complete search history.

(56) References Cited

U.S. PATENT DOCUMENTS

| 3,953,566 | A | * | 4/1976 | Gore ........................... 264/505 |
| 4,877,661 | A |   | 10/1989 | House et al. |
| 4,887,661 | A |   | 12/1989 | Hauke |
| 5,225,131 | A | * | 7/1993 | Tamaru et al. ................ 264/113 |
| 5,308,664 | A |   | 5/1994 | House et al. |
| 5,429,869 | A |   | 7/1995 | McGregor et al. |
| 5,552,100 | A |   | 9/1996 | Shannon et al. |
| 5,677,031 | A | * | 10/1997 | Allan et al. .................... 428/137 |
| 5,911,926 | A | * | 6/1999 | Harada et al. .................. 264/41 |
| 6,030,428 | A | * | 2/2000 | Ishino et al. .................... 55/486 |
| 6,207,091 | B1 | * | 3/2001 | Kanamoto et al. ........ 264/173.11 |
| 6,689,160 | B1 | * | 2/2004 | Okuda et al. .................. 623/1.39 |
| 2003/0062644 | A1 | * | 4/2003 | Oyama et al. .................... 264/41 |
| 2006/0141159 | A1 |   | 6/2006 | Okuda et al. |
| 2006/0154010 | A1 |   | 7/2006 | Oyama |
| 2006/0251871 | A1 |   | 11/2006 | Masuda et al. |
| 2007/0160810 | A1 |   | 7/2007 | Hayashi et al. |

FOREIGN PATENT DOCUMENTS

| EP | 313263 A | 4/1989 |
| EP | 686169 A1 | 12/1995 |
| EP | 823924 A1 | 2/1998 |
| JP | 61-57328 A | 3/1986 |
| JP | 2-645 A | 1/1990 |
| JP | 3-505596 A | 12/1991 |
| JP | 5-43730 A | 2/1993 |
| JP | 8-507316 A | 8/1996 |
| JP | 2547243 B2 | 8/1996 |
| JP | 8-269221 A | 10/1996 |
| JP | 11-511707 A | 10/1999 |
| JP | 2004-265844 A | 9/2004 |
| JP | 2005-200693 A | 7/2005 |
| WO | WO 89/11608 A1 | 11/1989 |
| WO | WO 94/19400 A1 | 9/1994 |
| WO | WO 96/34911 A1 | 11/1996 |
| WO | WO 2004/108322 A1 | 12/2004 |
| WO | WO 2005/003866 A1 | 1/2005 |

* cited by examiner

*Primary Examiner* — Joseph S Del Sole
*Assistant Examiner* — Kimberly A Stewart
(74) *Attorney, Agent, or Firm* — McDermott Will & Emery LLP

(57) ABSTRACT

An expanded porous polytetrafluoroethylene film having residual strain of at most 11.0% as measured after a load required to indent a rod, which is in a columnar form that its outer diameter is at least 2 mm and at least 1.9 times as much as the thickness of the film, and has a smooth plane perpendicular to its axis at a free end surface thereof and a modulus of longitudinal elasticity of at least $1.0 \times 10^4$ kgf/mm$^2$, up to 20% of the film thickness at a strain rate of 100%/min from the free end surface is applied repeatedly 20 times, and a production process of the porous film, in which a step of compressing an expanded porous polytetrafluoroethylene film having a high draw ratio is provided.

8 Claims, No Drawings

EXPANDED POROUS POLYTETRAFLUOROETHYLENE FILM HAVING ELASTIC RECOVERY PROPERTY IN THICKNESS-WISE DIRECTION OF THE FILM, PRODUCTION PROCESS THEREOF, AND USE OF THE POROUS FILM

RELATED APPLICATIONS

This application is a Divisional of U.S. application Ser. No. 10/587,281, filed on Jul. 25, 2006 now abandoned, which is a U.S. National Phase under 35 U.S.C. §371 of International Application No. PCT/JP2005/007198, filed on Apr. 7, 2005, claiming priority of Japanese Application No. 2004-112659, filed on Apr. 7, 2004, the entire contents of each of which are hereby incorporated by reference.

TECHNICAL FIELD

The present invention relates to an expanded porous polytetrafluoroethylene film having elastic recovery property in a thickness-wise direction of the film, a production process thereof, and use of the porous film for various applications. The expanded porous polytetrafluoroethylene film according to the present invention can be suitably used as cushioning materials, sealing materials, semiconductor-packaging members, members for inspection of semiconductors, medical implanting material, and the like making good use of its properties such as heat resistance, chemical resistance and elastic recovery property.

BACKGROUND ART

An expanded porous polytetrafluoroethylene material produced by stretching of polytetrafluoroethylene (hereinafter abbreviated as "PTFE") has a microstructure composed of a great number of fibrils (fine fibers) and a great number of nodes connected to each other by the fibrils, and this microstructure forms a porous structure of open-cell property. In the expanded porous PTFE material, its porous structures such as a pore diameter and a porosity can be optionally preset by controlling stretching conditions.

Since the expanded porous PTFE material has the porous structure, properties such as flexibility, fluid permeability, fine particle-collecting property, filterability, low dielectric constant and low dielectric loss tangent are imparted thereto, in addition to properties such as heat resistance and chemical resistance, and surface properties such as low frictional coefficient, water repellency and non-blocking property that PTFE itself has. Since the expanded porous PTFE material has such unique properties, its applications to general industrial field and medical field, and the like enlarge. In the medical field, the expanded porous PTFE material is a material optimum for applications that directly touch intracorporeal tissues because it has properties such as chemical stability, non-toxicity to vital bodies, non-degradability and anti-thrombus property.

The PTFE itself forming the expanded porous PTFE film is a resin that is hard and brittle. On the other, the expanded porous PTFE material has good flexibility because it has the porous structure. Therefore, the expanded porous PTFE material is commonly used as cushioning materials, sealing materials and spacers. Since the expanded porous PTFE material is allowed to flexibly change its form conforming to forms of various intracorporeal tissues, or the like, it is used as medical polymeric materials such as patch materials, artificial blood vessels, catheters and artificial substitutive materials for cartilages as porous materials having a structure of a sheet or tube.

The expanded porous PTFE material is generally produced in the form of a tube, sheet (including a film), monofilament or the like. Among these forms, a sheet-like expanded porous PTFE film is commonly used for applications such as cushioning materials and sealing materials. The expanded porous PTFE film is obtained by not only forming a sheet from the beginning, but also forming a tube and longitudinally cutting the tube in the form of a sheet. It is also conducted to form tubes or various kinds of structures with the expanded porous PTFE film. For example, a tube can be formed by winding the expanded porous PTFE film on an outer peripheral surface of a rod-like support and fusion-bonding or adhesive-bonding its both ends.

However, a conventional expanded porous PTFE film is flexible, but has involved a problem that when the film is deformed by applying a load in a thickness-wise direction thereof, it is hard to recover its form to the original form even when the load is removed because the film is left great residual strain by deformation. As described above, the conventional expanded porous PTFE film is insufficient in elastic recovery property in the thickness-wise direction. Therefore, the film cannot be used repeatedly because of difficulty of recovering its form when the film is pressed in the thickness-wise direction to deform it once or at most several times. Under the circumstances, thus the expanded porous PTFE film cannot but use it only once and then discard it according to its applications.

On the other hand, repeated use is often required in applications such as a cushioning material and a sealing material. When a plurality of through-holes are provided in the expanded porous PTFE film, and a conductive metal is applied to the wall surfaces of the through-holes by a means such as plating, a flexible anisotropically conductive film can be obtained. Such an anisotropically conductive film can be used in electrical connection between circuit devices in semiconductor devices or the like or inspection of electrical reliability for circuit boards or the like. In this case, the anisotropically conductive film is pressed between terminals (electrodes) opposite to each other to conduct electrical connection or inspection of electrical reliability. However, there is room for improvement in elastic recovery property and durability upon repeated use of a expanded porous PTFE film used as a base film of the anisotropically conductive film.

Even in medical applications, the expanded porous PTFE film is used in a field of, for example, intracorporeally implanting materials such as artificial substitutive materials for cartilages. However, the expanded porous PTFE film may not exhibit its sufficient function in some cases due to insufficient cushioning property because it is hard to recover its form to the original form when it is pressed and deformed in vivo.

There has heretofore been proposed a method for causing a formed product of an expanded porous PTFE material having a form of a tube or sheet to possess rapid recovery property in its stretched direction (Japanese Patent No. 2547243). Japanese Patent No. 2547243 (hereinafter referred to as "Patent Art. 1) corresponds to U.S. Pat. Nos. 4,877,661 and 5,308,664.

Patent Art. 1 shows that when a mixture of a PTFE aggregate and a liquid lubricant is extruded in the form of a tube or sheet, and the extrudate is then stretched in its longitudinal direction, an expanded PTFE tube or sheet, which has a microstructure of nodes connected by fibrils, and in which the fibrils are stretched in the longitudinal direction, is obtained.

Patent Art. 1 describes a process comprising compressing such an expanded porous PTFE material in the longitudinal direction to reduce its size, fixing the compressed state, heating the compressed expanded porous PTFE material and re-stretching it in the first stretched direction. According to this process, there can be provided a formed product of the expanded porous PTFE material, which can be stretched in the longitudinal direction and rapidly recover its length to the original length. According to the process described in Patent Art. 1, however, stretchability in a stretched direction (plane direction) can be applied to an expanded porous PTFE sheet, but elastic recovery property cannot be imparted in its thickness-wise direction.

There has also be proposed a process comprising inserting a porous polymeric material such as an expanded porous PTFE material into a mold and selectively compressing regions of the porous polymeric material in such a manner that one region has a higher density than the other region, thereby producing a compressible gasket having rigidity (Japanese Patent Application Laid-Open (KOHYO) No. 3-505596 (through PCT route)). Japanese Patent Application Laid-Open (KOHYO) No. 3-505596 (through PCT route) (hereinafter referred to as "Patent Art. 2) corresponds to WO 89/11608.

According to the process described in Patent Art. 2, however, a high-density region can be formed by selectively compressing the expanded porous PTFE material to partially enhance its rigidity, thereby retaining its shape, but elastic recovery property cannot be imparted in its thickness-wise direction.

DISCLOSURE OF THE INVENTION

It is an object of the present invention to provide an expanded porous polytetrafluoroethylene film improved in elastic recovery property in its thickness-wise direction, and a production process thereof. Another object of the present invention is also to provide an anisotropically conductive film, cushioning material, intracorporeally implanting material or the like formed by using an expanded porous polytetrafluoroethylene film excellent in elastic recovery property in its thickness-wise direction.

The present inventors have carried out an investigation as to production conditions in detail to optimize the conditions with a view toward obtaining an expanded porous PTFE films having elastic recovery property in its thickness-wise direction. As a result, it has been found that a new step of compressing a sintered expanded porous PTFE film is added, whereby the above-described objects can be achieved.

In general, an expanded porous PTFE film is produced through an extrusion step of extruding a mixture of unsintered PTFE powder and a lubricant to prepare an extrudate in the form of a sheet or rod, a rolling step of rolling the extrudate to prepare a rolled sheet, a stretching step of stretching the rolled sheet to prepare an unsintered expanded porous PTFE film and a sintering step of heating the unsintered expanded porous PTFE film to sinter it.

In a technical field of using an expanded porous PTFE film as a sealing material, cushioning material or the like, the film has heretofore required a relatively great thickness, so that it has been general to produce such a film under production conditions that a rolling ratio and/or a draw ratio is made low. However, an expanded porous PTFE film obtained under such production conditions has been poor in elastic recovery property in its thickness-wise direction.

Therefore, the present inventors have carried out an extensive investigation. As a result, it has been surprisingly found that a draw ratio in the stretching step is made high, and a compression step is added after sintering, thereby obtaining an expanded porous PTFE film improved in elastic recovery property in its thickness-wise direction. It is desirable that the rolling ratio be also made high in the rolling step from the viewpoint of improving the elastic recovery property. When the thickness of the resulting film is too small by adding the rolling step, it is only necessary to laminate a plurality of unsintered expanded porous PTFE films obtained in the stretching step and having a high draw ratio on each other and integrally fusion-bond them to each other by sintering, thereby preparing an expanded porous PTFE film having a great thickness, and compress the thus-obtained film.

Since the expanded porous PTFE film according to the present invention is small in residual strain even when it is deformed by applying a load in its thickness-wise direction, it is excellent in shape-recovering ability. The present invention has been led to completion on the basis of these findings.

According to the present invention, there is thus provided an expanded porous polytetrafluoroethylene film having a microstructure composed of fine fibrils and nodes connected by the fibrils and elastic recovery property in its thickness-wise direction, wherein the film has residual strain of at most 11.0% as measured after a load required to indent a rod, which is in a columnar form that its outer diameter is at least 2 mm and at least 1.9 times as much as the thickness of the film, and has a smooth plane perpendicular to its axis at a free end surface thereof and a modulus of longitudinal elasticity of at least $1.0 \times 10^4$ kgf/mm$^2$, up to 20% of the film thickness at a strain rate of 100%/min from the free end surface is applied repeatedly 20 times.

According to the present invention, there is also provided a process for producing an expanded porous polytetrafluoroethylene film having a microstructure composed of fine fibrils and nodes connected by the fibrils, the process comprising the following steps 1 to 6:

(1) an extrusion step 1 of extruding a mixture of unsintered polytetrafluoroethylene powder and a lubricant to prepare an extrudate in the form of a sheet or rod;
(2) a rolling step 2 of rolling the extrudate to prepare a rolled sheet;
(3) a stretching step 3 of biaxially stretching the rolled sheet in lengthwise and crosswise directions at a total draw ratio exceeding 12 times to prepare an expanded porous polytetrafluoroethylene film (A);
(4) a sintering step 4 of heating the expanded porous polytetrafluoroethylene film (A) to a temperature not lower than the melting point of polytetrafluoroethylene in a state fixed so as not to shrink the film to sinter the film;
(5) a cooling step 5 of cooling the sintered expanded porous polytetrafluoroethylene film (A); and
(6) a compression step 6 of compressing the cooled expanded porous polytetrafluoroethylene film (A) in a thickness-wise direction of the film,
thereby obtaining an expanded porous polytetrafluoroethylene film (B) having elastic recovery property in the thickness-wise direction of the film.

According to the present invention, there is further provided a process for producing an expanded porous polytetrafluoroethylene film having a microstructure composed of fine fibrils and nodes connected by the fibrils, the process comprising the following steps I to VII:

(1) an extrusion step I of extruding a mixture of unsintered polytetrafluoroethylene powder and a lubricant to prepare an extrudate in the form of a sheet or rod;
(2) a rolling step II of rolling the extrudate to prepare a rolled sheet;

(3) a stretching step III of biaxially stretching the rolled sheet in lengthwise and crosswise directions at a total draw ratio exceeding 12 times to prepare an expanded porous polytetrafluoroethylene film (A);
(4) a multi-layer film-forming step IV of laminating at least two expanded porous polytetrafluoroethylene films (A) to prepare a multi-layer film (A1);
(5) a sintering step V of heating the multi-layer film (A1) to a temperature not lower than the melting point of polytetrafluoroethylene in a state fixed so as not to shrink all the layers to sinter the film, and at the same time integrally fusion-bond the respective layers to each other to prepare an expanded porous polytetrafluoroethylene film (A2);
(6) a cooling step VI of cooling the sintered expanded porous polytetrafluoroethylene film (A2); and
(7) a compression step VII of compressing the cooled expanded porous polytetrafluoroethylene film (A2) in a thickness-wise direction of the film,
thereby obtaining an expanded porous polytetrafluoroethylene film (B1) having elastic recovery property in the thickness-wise direction of the film.

Since the expanded porous PTFE films according to the present invention are excellent in elastic recovery property against deformation by compression in the thickness-wise direction, they can be used repeatedly when they are used in applications such as sealing materials and cushioning materials, are convenient for use and can contribute to reductions in cost to a great extent and in discharge of waste matter. The expanded porous PTFE films according to the present invention are also suitable for use as intracorporeally implanting materials having cushioning property. The expanded porous PTFE films according to the present invention are further suitable for use as base films of anisotropically conductive films for inspection of electronic parts required to be used repeatedly.

BEST MODE FOR CARRYING OUT THE INVENTION

The expanded porous PTFE film according to the present invention can be produced in accordance with the following process. Namely, the first production process according to the present invention comprises the following steps 1 to 6:
(1) an extrusion step 1 of extruding a mixture of unsintered polytetrafluoroethylene powder and a lubricant to prepare an extrudate in the form of a sheet or rod;
(2) a rolling step 2 of rolling the extrudate to prepare a rolled sheet;
(3) a stretching step 3 of biaxially stretching the rolled sheet in lengthwise and crosswise directions at a total draw ratio exceeding 12 times to prepare an expanded porous polytetrafluoroethylene film (A);
(4) a sintering step 4 of heating the expanded porous polytetrafluoroethylene film (A) to a temperature not lower than the melting point of polytetrafluoroethylene in a state fixed so as not to shrink the film to sinter the film;
(5) a cooling step 5 of cooling the sintered expanded porous polytetrafluoroethylene film (A); and
(6) a compression step 6 of compressing the cooled expanded porous polytetrafluoroethylene film (A) in a thickness-wise direction of the film.

The extrusion step 1 can be carried out in accordance with a method well known in this technical field. As a specific example thereof, a mixture of unsintered PTFE powder (fine powder for paste extrusion) and a lubricant (for example, solvent naphtha, petroleum or the like) is compressed in a cylinder to preform it into a columnar form, and the resultant preform (billet) is then charged into an extrusion cylinder and pressurized by a ram to extrude it through a die, thereby preparing an extrudate in the form of a sheet or rod. In order to obtain the sheet-like extrudate, a T-die is connected to the tip of the extrusion cylinder, and a die opened in a circular form is used to obtain the rod-like extrudate.

The rolling step 2 can also be carried out in accordance with a conventional method. The sheet-like or rod-like extrudate obtained in the extrusion step is rolled by means of a rolling mill such as a roll or press before the lubricant is vaporized out to prepare a rolled sheet having a predetermined thickness. A rolling ratio is preferably as high as possible. For example, when the extrudate is in the form of a sheet, the extrudate is rolled in such a manner that the rolling ratio (T1/T2) represented by a value obtained by dividing a film thickness T1 before the rolling by a film thickness T2 after the rolling is generally at least 1.3 times, preferably at least 1.5 times, more preferably at least 1.8 times, particularly preferably at least 2.0 times. When the rolling ratio is controlled to at least 2.0 times in particular, a variation of tangent modulus (which will be described subsequently) can be made markedly narrow. As a result, the elastic recovery property in the thickness-wise direction can be more improved. The upper limit of the rolling ratio is of the order of generally 10 times, preferably 8 times, more preferably 5 times. When the extrudate is in the form of a rod, the rolling ratio is controlled in view of the thickness of a sheet formed from the rod.

The thickness of the rolled sheet may be suitably preset as needed. However, it is within a range of generally 0.3 to 2.0 mm, preferably 0.4 to 1.5 mm, particularly preferably 0.5 to 1.3 mm. If the thickness of the rolled sheet is too small, difficulty is encountered upon stretching at a high draw ratio, or the thickness of the resulting expanded porous PTFE film becomes too small. If the thickness of the rolled sheet is too great, difficulty is encountered upon even stretching, or it may be difficult in some cases to sufficiently enhance the draw ratio.

The rolled sheet is stretched after the lubricant is removed from the rolled sheet or without removing the lubricant. When the lubricant is not removed from the rolled sheet, the lubricant is removed in a subsequent step such as the stretching step. When the lubricant is removed from the rolled sheet, a method that the rolled sheet is passed through, for example, a drying oven of 100 to 300° C. to volatilize off the lubricant can be adopted.

In the stretching step 3, the rolled sheet is biaxially stretched in lengthwise and crosswise directions to prepare an expanded porous PTFE film (A) in an unsintered state. As a biaxially stretching method for the rolled sheet, can be adopted a simultaneous biaxially stretching method or sequential biaxially stretching method. It is however preferable to adopt the sequential stretching method that the rolled sheet is first stretched in a lengthwise direction (longitudinal direction or machine direction) and then stretched in a crosswise direction (width direction). In the sequential stretching method, may be adopted, for example, a method that the rolled sheet is stretched in the lengthwise direction between a low-speed roll and a high-speed roll, and then stretched in the crosswise direction by means of a tenter.

The draw ratio in the lengthwise direction is generally 1.2 to 10.0 times, preferably 1.5 to 8.0 times, more preferably 2.0 to 5.0 times. The draw ratio in the crosswise direction is generally 3.0 to 20.0 times, preferably 4.0 to 15.0 times, more preferably 5.0 to 13.0 times.

In the stretching step, the biaxial stretching is conducted in such a manner that the total draw ratio (E1×E2) represented by a product of the draw ratio E1 in the lengthwise direction and the draw ratio E2 in the crosswise direction exceeds 12 times. When the expanded porous PTFE film is used in applications such as sealing materials and cushioning materials, it is general to control the total draw ratio to at most 12 times for the purpose of making the film thickness great. If the total draw ratio is too low, however, the elastic recovery property cannot be sufficiently improved even when the expanded porous PTFE film is compressed after sintering.

The total draw ratio is preferably at least 15 times, more preferably at least 20 times. The upper limit of the total draw ratio is of the order of generally 40 times, preferably 30 times. The total draw ratio can be controlled within a desired range by controlling the draw ratio in the lengthwise direction and the draw ratio in the crosswise direction.

In the sintering step 4, the unsintered expanded porous polytetrafluoroethylene film is heated to a temperature not lower than the melting point (327° C.) of PTFE in a state fixed so as not to shrink the film to sinter the film. The sintering step can be conducted by passing the expanded porous PTFE film through an oven the atmosphere in which is generally 330 to 500° C., preferably 340 to 400° C. The stretched state is sintered and fixed by the sintering, whereby an expanded porous PTFE film improved in strength can be obtained.

In the sintering step, an expanded porous PTFE film having a porosity of generally at least 66%, preferably at least 68%, more preferably at least 70% is prepared. The upper limit of the porosity in the sintered expanded porous PTFE film is of the order of generally 80%, preferably 76%. By presetting the total draw ratio high and making the porosity of the resulting expanded porous PTFE film (A) high, it is easy to provide an expanded porous PTFE film (B) having a relatively high porosity and excellent flexibility and elastic recovery property in the subsequent compression step.

The thickness of the sintered expanded porous PTFE film (A) is generally 0.02 to 1.0 mm, preferably 0.03 to 0.8 mm, more preferably 0.04 to 0.5 mm, particularly preferably 0.05 to 0.3 mm.

In the cooling step 5, the expanded porous PTFE film (A) that is in a state heated to a high temperature upon the sintering is cooled. In the cooling step, the sintered expanded porous PTFE film is air-cooled at ambient temperature or quenched by blowing a cooling medium against the film. When the thickness of the sintered expanded porous PTFE film (A) is small, the film may be air-cooled at ambient temperature. It is however preferable to blow a cooling medium such as air against the expanded porous PTFE film (A) to quench it when the thickness is great. By quenching the film, the elastic recovery property in the thickness-wise direction of the film can be more improved. By the cooling step, the sintered expanded porous PTFE film (A) is generally cooled to room temperature (ordinary temperature of 10 to 30° C.).

In the compression step 6, the cooled expanded porous PTFE film (A) is compressed in the thickness-wise direction of the film to make the thickness of the film small. In the compression step, the expanded porous PTFE film (A) is compressed by means of a pressure roll or press. In the production process of the expanded porous PTFE film, a rolling treatment has been already conducted once in the rolling step 2, so that the compression in the compression step 6 may be referred to as "re-rolling", and the compression step may be referred to as "re-rolling step".

In the compression step, the expanded porous PTFE film (A) is compressed in such a manner that the compression ratio (t1/t2) represented by a value obtained by dividing a film thickness t1 before the compression (re-rolling) by a film thickness t2 after the compression is generally 1.1 to 4.0, preferably 1.2 to 3.0, particularly preferably 1.5 to 2.5.

After the compression, an expanded porous PTFE film (B) having good elastic recovery property in the thickness-wise direction of the film is provided. The porosity of the expanded porous PTFE film (B) is generally 40 to 75%, preferably 45 to 70%. If the porosity of the expanded porous PTFE film (B) is too low, such a film shows a tendency to lower the elastic recovery property in the thickness-wise direction of the film. The upper limit of the porosity in the expanded porous PTFE film (B) is limited to about 75% or lower by compression.

After the compression step, an expanded porous PTFE film (B) having excellent elastic recovery property in the thickness-wise direction of the film can be provided. This elastic recovery property can be quantitatively evaluated by measuring a value of "residual strain" in a film sample after a load required to indent a rod, which is in a columnar form that its outer diameter is at least 2 mm and at least 1.9 times as much as the thickness of the film, and has a smooth plane perpendicular to its axis at a free end surface thereof and a modulus of longitudinal elasticity of at least $1.0 \times 10^4$ kgf/mm$^2$, up to 20% of the film thickness at a strain rate of 100%/min from the free end surface is applied repeatedly 20 times.

An indenter used in the measurement of the residual strain is a rod, which is in a columnar form that its outer diameter is at least 2 mm and at least 1.9 times as much as the thickness of the film. The free end surface of this rod is a smooth plane perpendicular to its axis (major axis). This rod is a cemented carbide rod having a modulus of longitudinal elasticity of at least $1.0 \times 10^4$ kgf/mm$^2$. A material of the rod is, for example, hardened steel. This rod is sufficiently harder than the expanded porous PTFE film.

This rod and the expanded porous PTFE film are arranged in such a manner that the axis of the rod and the plane of the film cross at right angles, and the rod is indented into the porous film at a strain rate of 100%/min from the free end surface of the rod. A load required to indent the rod up to 20% of the film thickness is applied to the rod. The method for measuring the residual strain making use of this rod is applied to not only the above expanded porous PTFE film (B), but also an expanded porous PTFE film (B1), which will be described subsequently.

In order to smooth a variation of measured values of the residual strain, it is necessary to use a rod having an outer diameter sufficiently greater then the film thickness of the expanded porous PTFE film. Therefore, the outer diameter of the columnar rod is determined to be at least 2 mm and at least 1.9 times as much as the film thickness. When the thickness of the expanded porous PTFE film is not greater than 1 mm, the value of residual strain can be measured with good precision by using a rod having an outer diameter of 2 mm. When the thickness of the expanded porous PTFE film exceeds 1 mm, a rod having an outer diameter greater than 2 mm and 1.9 times as much as the film thickness is used. The upper limit of the outer diameter of the rod may vary according to the thickness of the expanded porous PTFE film. However, it is of the order of generally 20 mm, preferably 10 mm.

The residual strain of the expanded porous PTFE film (B) according to the present invention is generally controlled within a range of 11.0% or lower so as to give a proper value according to its application. For example, when the expanded porous PTFE film (B) is used as a cushioning material or sealing material, the residual strain is desirably controlled to 11.0% or lower, preferably 10.5% or lower. When the expanded porous PTFE film (B) is used for inspection of semiconductor devices, of which high precision is required, or as an intracorporeally implanting material, of which high safety is required, the residual strain is desirably controlled to preferably 10.0% or lower, more preferably 9.0% or lower, particularly preferably 6.5% or lower. The lower limit of the residual strain is generally 2.0, often 3.0.

According to the production process of the present invention, there can be provided a expanded porous PTFE film (B) having a tangent modulus of generally at least 800 gf/mm$^2$, preferably at least 1,000 gf/mm$^2$ on the average. The tangent modulus means a ratio of a compression pressure to shrinkage strain, which is represented as a slope of the tangent at an optional point on a compression pressure-shrink curve in the thickness-wise direction of the film. In the present invention, the tangent modulus is measured in accordance with a method described below.

A variation of tangent modulus in the expanded porous PTFE film (B) according to the present invention is generally 10.0% or lower, preferably 7.0% or lower, more preferably 5.0% or lower. The variation, CV value, of the tangent modulus is a value calculated out by an equation "CV value=standard deviation/average value". The expanded porous PTFE film (B) according to the present invention is low in the variation of tangent modulus. This fact also indicates that the film is even and excellent in elastic recovery property in the thickness-wise direction of the film. The expanded porous PTFE film (B) according to the present invention is preferably such that the residual strain is at most 10.5%, and the variation of tangent modulus is at most 7.0%, and more preferably such that the residual strain is at most 6.5%, and the variation of tangent modulus is at most 7.0%.

The thickness of the expanded porous PTFE film (B) according to the present invention may be suitably determined. However, it is generally 0.01 to 0.8 mm, preferably 0.02 to 0.5 mm, more preferably 0.03 to 0.4 mm, particularly preferably 0.04 to 0.3 mm. If the thickness of the expanded porous PTFE film (B) is too small, the flexibility of such a film as a sealing material, cushioning material or the like by itself becomes insufficient. On the other hand, since the expanded porous PTFE film (B) is composed of a single layer, it is difficult to make its rolling ratio and draw ratio high in the production process if the thickness thereof is made great in excess.

When it is intended to obtain an expanded porous PTFE film having a great film thickness after the compression step for the purpose of applying the resultant film to an application field of cushioning materials, sealing materials or the like, a multi-layer film-forming step may be provided to obtain an expanded porous PTFE film (B1). This expanded porous PTFE film (B1) can be produced in accordance with the following process. Namely, the second production process according to the present invention comprises the following steps I to VII:

(1) an extrusion step I of extruding a mixture of unsintered polytetrafluoroethylene powder and a lubricant to prepare an extrudate in the form of a sheet or rod;
(2) a rolling step II of rolling the extrudate to prepare a rolled sheet;
(3) a stretching step III of biaxially stretching the rolled sheet in lengthwise and crosswise directions at a total draw ratio exceeding 12 times to prepare an expanded porous polytetrafluoroethylene film (A);
(4) a multi-layer film-forming step IV of laminating at least two expanded porous polytetrafluoroethylene films (A) to prepare a multi-layer film (A1);
(5) a sintering step V of heating the multi-layer film (A1) to a temperature not lower than the melting point of polytetrafluoroethylene in a state fixed so as not to shrink all the layers to sinter the film, and at the same time integrally fusion-bond the respective layers to each other to prepare an expanded porous polytetrafluoroethylene film (A2);
(6) a cooling step VI of cooling the sintered expanded porous polytetrafluoroethylene film (A2); and
(7) a compression step VII of compressing the cooled expanded porous polytetrafluoroethylene film (A2) in a thickness-wise direction of the film.

The extrusion step I, rolling step II and stretching step III correspond to the extrusion step 1, rolling step 2 and stretching step 3 in the first production process, respectively. The features of the second production process according to the present invention reside in that the multi-layer film-forming step IV is provided and that the sintering step V of integrally fusion-bonding the respective layers to each other at the same time as the sintering.

In the multi-layer film-forming step IV, at least two unsintered expanded porous polytetrafluoroethylene films (A) obtained in the stretching step are laminated to prepare the multi-layer film (A1). In this multi-layer film (A1), the respective films are in a state separate from each other and not integrally bonded. The number of the unsintered expanded porous polytetrafluoroethylene films (A) used in the preparation of the multi-layer film (A1) may be suitably determined in view of the thickness of the individual films, the finally required thickness of the expanded porous PTFE film (B1) and the like. The number of the films is of the order of generally 2 to 30, preferably 2 to 20, more preferably 3 to 15. However, the number of films is not limited thereto.

In the sintering step V, the multi-layer film (A1) is heated to a temperature not lower than the melting point of PTFE in a state fixed so as not to shrink all the layers to sinter the film, and at the same time the respective layers are integrally fusion-bonded to each other to prepare the expanded porous polytetrafluoroethylene film (A2). Sintering conditions such as a sintering temperature are the same as those in the stretching step 3 of the first production process. In the second production process, however, the heat for the sintering in the sintering step is utilized to fusion-bond the respective layers to each other. When the respective layers are fusion-bonded to each other, all the layers are integrally bonded to each other to obtain an expanded porous PTFE film (A2).

In the sintering step V, an expanded porous PTFE film (A2) having a porosity of generally at least 66%, preferably at least 68%, more preferably at least 70% is prepared. The upper limit of the porosity in the sintered expanded porous PTFE film (A2) is of the order of generally 80%, preferably 76%. By making the porosity of the expanded porous PTFE film (A2) high, it is easy to provide an expanded porous PTFE film (B1) having a relatively high porosity and excellent flexibility and elastic recovery property in the subsequent compression step VII.

The thickness of the expanded porous PTFE film (A2) obtained after the sintering step is designed as necessary for the end application intended. However, the film thickness is generally 0.04 to 2.0 mm, preferably 0.06 to 1.6 mm, more preferably 0.08 to 1.3 mm, particularly preferably 0.1 to 1.1 mm. When the expanded porous PTFE film (B1) obtained after the compression step is used as a cushioning material or sealing material, the product thickness of about 2.0 mm or greater, more preferably about 3.0 to 10.0 mm may be required in some cases. In such a case, the thickness of the expanded porous PTFE film (A2) is desirably controlled so as to be greater than 2.0 mm, more preferably 5.0 to 30.0 mm.

In the cooling step VI, the expanded porous PTFE film (A2) that is in a state heated to a high temperature upon the sintering is cooled. In the cooling step, the sintered expanded porous PTFE film is air-cooled at ambient temperature or quenched by blowing a cooling medium against the film. The sintered expanded porous PTFE film (A2) may be air-cooled at ambient temperature. It is however preferable to blow a cooling medium such as air against the film to quench. By quenching the film, the elastic recovery property in the thickness-wise direction of the film can be more improved. By the cooling step, the sintered expanded porous PTFE film (A2) is generally cooled to room temperature (ordinary temperature of 10 to 30° C.).

In the compression step VII, the cooled expanded porous PTFE film (A2) is compressed in the thickness-wise direction of the film to make the thickness of the film small. In the compression step, the expanded porous PTFE film (A2) is compressed in such a manner that the compression ratio is generally 1.1 to 4.0, preferably 1.2 to 3.0, particularly preferably 1.5 to 2.5.

After the compression, an expanded porous PTFE film (B1) having good elastic recovery property in the thickness-wise direction of the film is provided. The porosity of the expanded porous PTFE film (B1) is generally 40 to 75%, preferably 45 to 70%.

After the compression, an expanded porous PTFE film (B1) having good elastic recovery property in the thickness-wise direction of the film can be provided. The residual strain of the expanded porous PTFE film (B1) according to the present invention is generally controlled within a range of 11.0% or lower so as to give a proper value according to its application. For example, when the expanded porous PTFE film (B1) is used as a cushioning material or sealing material, the residual strain is desirably controlled to 11.0% or lower, preferably 10.5% or lower. When the expanded porous PTFE film (B1) is used for inspection of semiconductor devices, of which high precision is required, or as an intracorporeally implanting material, of which high safety is required, the residual strain is desirably controlled to preferably 10.0% or lower, more preferably 9.0% or lower, particularly preferably 6.5% or lower. The lower limit of the residual strain is generally 2.0, often 3.0.

A variation of tangent modulus in the expanded porous PTFE film (B1) according to the present invention is generally 10.0% or lower, preferably 7.0% or lower, more preferably 5.0% or lower. The expanded porous PTFE film (B1) according to the present invention is low in the variation of tangent modulus. This fact also indicates that the film is even and excellent in elastic recovery property in the thickness-wise direction of the film. The expanded porous PTFE film (B1) according to the present invention is preferably such that the residual strain is at most 10.5%, and the variation of tangent modulus is at most 7.0%, and more preferably such that the residual strain is at most 6.5%, and the variation of tangent modulus is at most 7.0%.

The thickness of the expanded porous PTFE film (B1) after the compression step may be suitably designed as necessary for the end application intended. However, it is generally 0.02 to 1.6 mm, preferably 0.04 to 1.2 mm, more preferably 0.06 to 1.0 mm. When the expanded porous PTFE film (B1) according to the present invention is used as a cushioning material or sealing material, the film can be provided so as to give a thickness of greater than 2.0 mm, preferably about 3.0 to 10.0 mm.

The expanded porous PTFE films having elastic recovery property in the thickness-wise direction of the film according to the present invention can be produced in accordance with the first production process and second production process. The residual strain of the expanded porous PTFE films according to the present invention is 11.0% or lower, preferably 10.5% or lower, more preferably 10.0% or lower, still more preferably 9.0% or lower, particularly preferably 6.5% or lower. The expanded porous PTFE films according to the present invention are such that the tangent modulus is generally at least 800 gf/mm$^2$, preferably at least 1,000 gf/mm$^2$ on the average, and the variation of tangent modulus is generally at most 10.0%, preferably at most 7.0%, more preferably at most 5.0%. The porosity of the expanded porous PTFE films according to the present invention is generally 40 to 75%, preferably 45 to 70%.

The expanded porous PTFE films having elastic recovery property in the thickness-wise direction of the film according to the present invention can be used as sealing materials and cushioning materials by cutting them in proper shapes and sizes. The expanded porous PTFE films according to the present invention can also be used as intracorporeally implanting materials, anisotropically conductive films and the like as they are, or by forming them into structures of proper shapes or secondarily forming them.

The expanded porous PTFE films according to the present invention are suitable for use as base films of anisotropically conductive films. The anisotropically conductive film can be produced in accordance with, for example, a process comprising forming through-holes in the expanded porous PTFE film and selectively applying a conductive metal only to wall surfaces of the respective through-holes. In order to selectively apply the conductive metal only to the wall surfaces of the respective through-holes, is mentioned a process comprising arranging a masking material for plating on both surfaces of the expanded porous PTFE film, applying a plating catalyst only to the respective through-holes, conducting electroless plating after separating the masks and further conducting electroplating as needed. Since such an anisotropically conductive film is excellent in elastic recovery property in the thickness-wise direction of the film, it can be preferably used in electrical connection between circuit devices in semiconductor devices or inspection of electrical reliability in circuit boards or the like.

When the expanded porous PTFE film according to the present invention is used in a field of intracorporeally implanting materials such as artificial substitutive materials for cartilages, the expanded porous PTFE film can exhibit its sufficient function without lacking cushioning property because its form is easily recovered to the original form when it is pressed and deformed in vivo.

EXAMPLES

The present invention will hereinafter be described more specifically by the following Examples and Comparative Examples. Various properties in the present invention are measured in accordance with the following respective methods.

(1) Rolling Ratio and Compression Ratio (Re-Rolling Ratio):

A value obtained by dividing a film thickness T1 before rolling by a film thickness T2 after rolling was regarded as a rolling ratio (T1/T2). A value obtained by dividing a film thickness t1 before compression (re-rolling) by a film thickness t2 after compression (re-rolling) was regarded as a re-rolling ratio (t1/t2).

(2) Draw Ratio:

A draw ratio in a lengthwise direction was calculated out in accordance with the following equation (i).

Draw ratio in lengthwise direction=Finishing speed (take-up speed) of a stretched product/Feeding speed of a material before stretching  (i)

A draw ratio in a crosswise direction was calculated out in accordance with the following equation (ii).

$$\text{Draw ratio in lengthwise direction} = \text{Distance between tenter chucks before stretching/Distance between tenter chucks after stretching} \quad (ii)$$

A total draw ratio was calculated out in accordance with the following equation (iii).

$$\text{Total draw ratio} = \text{Draw ratio in the lengthwise direction} \times \text{Draw ratio in the crosswise direction} \quad (iii)$$

(3) Porosity:

A volume was determined on the basis of a difference between a dry weight of an expanded porous PTFE material and its weight in water. Regarding a true specific gravity of PTFE as 2.25 g/cc, a volume of the resin was calculated out from this true specific gravity and the dry weight of the expanded porous PTFE material. A void volume was determined by subtracting the volume of the resin from the volume of the expanded porous PTFE material. A porosity (%) was calculated out in accordance with the following equation (iv).

$$(\text{Void volume/Volume of the material}) \times 100 \quad (iv)$$

(4) Tangent Modulus and Variation Thereof:

A cemented carbide rod having an outer diameter of 2 mm and a smooth plane at its free end surface was indented into an expanded porous PTFE film at a strain rate of 100%/min in the thickness-wise direction of the film from the free end surface thereof to measure a "stress ($gf/mm^2$)-strain curve" at 4 points. A Slope between 10% and 20% of strain intervals was determined by the method of least squares to find an average value and a variation (CV value=standard deviation/average value).

(5) Elastic Recovery Property:

A cemented carbide rod having an outer diameter of 2 mm and a smooth plane at its free end surface was indented into an expanded porous PTFE film at a strain rate of 100%/min in the thickness-wise direction of the film from the free end surface thereof to measure a load required to indent the rod up to 20% of the thickness of the film at 4 points to determine a "20% average load". After the average load was then applied repeatedly 20 times at a strain rate of 100%/min by means of the same device, residual strain was measured at a point.

Example 1

Into 100 parts by weight of fine PTFE powder (F104, product of Daikin Chemical Co., Ltd.), was incorporated 26 parts by weight of naphtha, and they were mixed. This mixture was left to stand for about 24 hours at 60° C. to get the respective components intimate with each other. The mixture was then compressed within a cylinder having an inner diameter of about 130 mm to preform the mixture. The preform in the form of a column was charged into an extrusion cylinder having an inner diameter of 130 mm and extruded through a T-die into a sheet having a width of 150 mm and a thickness of 2 mm. The resultant sheet-like extrudate was then rolled so as to give a rolling ratio of 4.0 and a film thickness of 0.50 mm.

The rolled sheet obtained above was stretched at a draw ratio of 2.25 times at 200° C. in a lengthwise direction thereof and then at a draw ratio of 11.0 times at 200° C. in a crosswise direction thereof. The total draw ratio was 24.75 times. The resultant expanded sheet was passed through an oven, the atmosphere in which was 350° C., to sinter it. The porosity of the expanded sheet as measured at this point of time was about 72%, and the thickness of the film was 0.08 mm. After the film was air-cooled, this expanded sheet was compressed (compression ratio: 2.0) by means of a rolling mill so as to give a film thickness of about 0.04 mm. The porosity of the thus-obtained expanded porous PTFE film was about 50%. The results are shown in Table 1.

Example 2

Into 100 parts by weight of fine PTFE powder (F104, product of Daikin Chemical Co., Ltd.), was incorporated 26 parts by weight of naphtha, and they were mixed. This mixture was left to stand for about 24 hours at 60° C. to get the respective components intimate with each other. The mixture was then compressed within a cylinder having an inner diameter of about 130 mm to preform the mixture. The preform in the form of a column was then charged into an extrusion cylinder having an inner diameter of 130 mm and extruded through a T-die into a sheet having a width of 150 mm and a thickness of 2 mm. The resultant sheet-like extrudate was then rolled so as to give a rolling ratio of 2.7 and a film thickness of 0.75 mm.

The rolled sheet obtained above was stretched at a draw ratio of 2.25 times at 200° C. in a lengthwise direction thereof and then at a draw ratio of 11.0 times at 200° C. in a crosswise direction thereof. The total draw ratio was 24.75 times. The resultant expanded sheet was passed through an oven, the atmosphere in which was 350° C., to sinter it. The porosity of the expanded sheet as measured at this point of time was about 72%, and the thickness of the film was 0.12 mm. After the film was air-cooled, this expanded sheet was compressed (compression ratio: 1.7) by means of a rolling mill so as to give a film thickness of about 0.07 mm. The porosity of the thus-obtained expanded porous PTFE film was about 50%. The results are shown in Table 1.

Example 3

Into 100 parts by weight of fine PTFE powder (F104, product of Daikin Chemical Co., Ltd.), was incorporated 26 parts by weight of naphtha, and they were mixed. This mixture was left to stand for about 24 hours at 60° C. to get the respective components intimate with each other. The mixture was then compressed within a cylinder having an inner diameter of about 130 mm to preform the mixture. The resultant preform in the form of a column was charged into an extrusion cylinder having an inner diameter of 130 mm and extruded through a T-die into a sheet having a width of 150 mm and a thickness of 2 mm. This sheet-like extrudate was rolled so as to give a rolling ratio of 2.0 and a film thickness of 1.00 mm.

The rolled sheet obtained above was stretched at a draw ratio of 2.25 times at 200° C. in a lengthwise direction thereof and then at a draw ratio of 11.0 times at 200° C. in a crosswise direction thereof. The total draw ratio was 24.75 times. The resultant expanded sheet was then passed through an oven, the atmosphere in which was 350° C., to sinter it. The porosity of the expanded sheet as measured at this point of time was about 72%, and the thickness of the film was 0.18 mm. After the film was air-cooled, the expanded sheet was compressed (compression ratio: 1.2) by means of a rolling mill so as to give a film thickness of about 0.15 mm. The porosity of the thus-obtained expanded porous PTFE film was about 65%. The results are shown in Table 1.

Example 4

Into 100 parts by weight of fine PTFE powder (F104, product of Daikin Chemical Co., Ltd.), was incorporated 26 parts by weight of naphtha, and they were mixed. This mixture was left to stand for about 24 hours at 60° C. to get the respective components intimate with each other. The mixture was then compressed within a cylinder having an inner diameter of about 130 mm to preform the mixture. The resultant preform in the form of a column was charged into an extrusion cylinder having an inner diameter of 130 mm and extruded through a T-die into a sheet having a width of 150 mm and a thickness of 2 mm. The resultant sheet-like extrudate was rolled so as to give a rolling ratio of 2.0 and a film thickness of 1.00 mm.

The rolled sheet obtained above was stretched at a draw ratio of 2.25 times at 200° C. in a lengthwise direction thereof and then at a draw ratio of 11.0 times at 200° C. in a crosswise direction thereof. The total draw ratio was 24.75 times. The resultant expanded sheet was then passed through an oven, the atmosphere in which was 350° C., to sinter it. The porosity of the expanded sheet as measured at this point of time was about 72%, and the thickness of the film was 0.18 mm. After the film was air-cooled, this expanded sheet was compressed (compression ratio: 1.8) by means of a rolling mill so as to give a film thickness of about 0.10 mm. The porosity of the thus-obtained expanded porous PTFE film was about 50%. The results are shown in Table 1.

Example 5

Into 100 parts by weight of fine PTFE powder (F104, product of Daikin Chemical Co., Ltd.), was incorporated 26 parts by weight of naphtha, and they were mixed. This mixture was left to stand for about 24 hours at 60° C. to get the respective components intimate with each other. The mixture was then compressed within a cylinder having an inner diameter of about 130 mm to preform the mixture. The resultant preform in the form of a column was charged into an extrusion cylinder having an inner diameter of 130 mm and extruded through a T-die into a sheet having a width of 150 mm and a thickness of 2 mm. The resultant sheet-like extrudate was rolled so as to give a rolling ratio of 2.0 and a film thickness of 1.00 mm.

The resultant rolled sheet was stretched at a draw ratio of 2.25 times at 200° C. in a lengthwise direction thereof and then at a draw ratio of 11.0 times at 200° C. in a crosswise direction thereof. The total draw ratio was 24.75 times. Six expanded sheets obtained in such a manner were superimposed on one another and fixed by holding them between aluminum-made frames having an inner diameter of 300 mm. This laminate was left to stand for 2 hours in a thermostat, the atmosphere in which was 350° C., thereby conducting sintering and fusion bonding between the respective layers at the same time. After the sintering, the expanded sheet obtained by integrally bonding the layers was taken out of the thermostat and air-dried. The porosity of the expanded sheet as measured at this point of time was about 72%, and the thickness of the film was 1.05 mm. The expanded sheet was then compressed (compression ratio: 1.8) by means of a rolling mill so as to give a film thickness of about 0.60 mm. The porosity of the thus-obtained expanded porous PTFE film was about 50%. The results are shown in Table 1.

Example 6

Into 100 parts by weight of fine PTFE powder (F104, product of Daikin Chemical Co., Ltd.), was incorporated 26 parts by weight of naphtha, and they were mixed. This mixture was left to stand for about 24 hours at 60° C. to get the respective components intimate with each other. The mixture was then compressed within a cylinder having an inner diameter of about 130 mm to preform the mixture. The resultant preform in the form of a column was charged into an extrusion cylinder having an inner diameter of 130 mm and extruded through a T-die into a sheet having a width of 150 mm and a thickness of 2 mm. The resultant sheet-like extrudate was rolled so as to give a rolling ratio of 2.0 and a film thickness of 1.00 mm.

The resultant rolled sheet was stretched at a draw ratio of 2.25 times at 200° C. in a lengthwise direction thereof and then at a draw ratio of 11.0 times at 200° C. in a crosswise direction thereof. The total draw ratio was 24.75 times. Six expanded sheets obtained in such a manner were superimposed on one another and fixed by holding them between aluminum-made frames having an inner diameter of 300 mm. This laminate was left to stand for 2 hours in a thermostat, the atmosphere in which was 350° C., thereby conducting sintering and fusion bonding between the respective layers at the same time. After the sintering, air of room temperature was directly blown against the expanded sheet obtained by integrally bonding the layers under a pressure of 4 kg/cm$^2$ from an air blowing port provided in the thermostat to forcedly quench the film at a breath. The porosity of the expanded sheet as measured at this point of time was about 72%, and the thickness of the film was 1.05 mm. The expanded sheet was then compressed (compression ratio: 1.8) by means of a rolling mill so as to give a film thickness of about 0.60 mm. The porosity of the thus-obtained expanded porous PTFE film was about 50%. The results are shown in Table 1.

Example 7

Into 100 parts by weight of fine PTFE powder (F104, product of Daikin Chemical Co., Ltd.), was incorporated 26 parts by weight of naphtha, and they were mixed. This mixture was left to stand for about 24 hours at 60° C. to get the respective components intimate with each other. The mixture was then compressed within a cylinder having an inner diameter of about 130 mm to preform the mixture. The resultant preform in the form of a column was charged into an extrusion cylinder having an inner diameter of 130 mm and extruded through a T-die into a sheet having a width of 150 mm and a thickness of 2 mm. The resultant sheet-like extrudate was rolled so as to give a rolling ratio of 1.6 and a film thickness of 1.25 mm.

The rolled sheet obtained above was stretched at a draw ratio of 2.25 times at 200° C. in a lengthwise direction thereof and then at a draw ratio of 11.0 times at 200° C. in a crosswise direction thereof. The total draw ratio was 24.75 times. The resultant expanded sheet was passed through an oven, the atmosphere in which was 350° C., to sinter it. The porosity of the expanded sheet as measured at this point of time was about 72%, and the thickness of the film was 0.26 mm. After the film was air-cooled, the expanded sheet was compressed (compression ratio: 1.7) by means of a rolling mill so as to give a film thickness of about 0.15 mm. The porosity of the thus-obtained expanded porous PTFE film was about 50%. The results are shown in Table 2.

Example 8

Into 100 parts by weight of fine PTFE powder (F104, product of Daikin Chemical Co., Ltd.), was incorporated 26 parts by weight of naphtha, and they were mixed. This mixture was left to stand for about 24 hours at 60° C. to get the respective components intimate with each other. The mixture was then compressed within a cylinder having an inner diameter of about 130 mm to preform the mixture. The resultant preform in the form of a column was charged into an extrusion cylinder having an inner diameter of 130 mm and extruded through a T-die into a sheet having a width of 150 mm and a thickness of 2 mm. The resultant sheet-like extrudate was rolled so as to give a rolling ratio of 1.3 and a film thickness of 1.50 mm.

The rolled sheet obtained above was stretched at a draw ratio of 2.25 times at 200° C. in a lengthwise direction thereof and then at a draw ratio of 11.0 times at 200° C. in a crosswise direction thereof. The total draw ratio was 24.75 times. The resultant expanded sheet was passed through an oven, the atmosphere in which was 350° C., to sinter it. The porosity of the expanded sheet as measured at this point of time was about 72%, and the thickness of the film was 0.28 mm. After the film was air-cooled, the expanded sheet was compressed (compression ratio: 1.8) by means of a rolling mill so as to give a film thickness of about 0.16 mm. The porosity of the thus-obtained expanded porous PTFE film was about 50%. The results are shown in Table 2.

Comparative Example 1

Into 100 parts by weight of fine PTFE powder (F104, product of Daikin Chemical Co., Ltd.), was incorporated 26 parts by weight of naphtha, and they were mixed. This mixture was left to stand for about 24 hours at 60° C. to get the respective components intimate with each other. The mixture was then compressed within a cylinder having an inner diameter of about 130 mm to preform the mixture. The resultant preform in the form of a column was charged into an extrusion cylinder having an inner diameter of 130 mm and extruded through a T-die into a sheet having a width of 150 mm and a thickness of 2 mm. The resultant sheet-like extrudate was rolled so as to give a rolling ratio of 1.6 and a film thickness of 1.25 mm.

The rolled sheet obtained above was stretched at a draw ratio of 3.00 times at 200° C. in a lengthwise direction thereof and then at a draw ratio of 4.00 times at 200° C. in a crosswise direction thereof. The total draw ratio was 12.00 times. The resultant expanded sheet was passed through an oven, the atmosphere in which was 350° C., to sinter it. The porosity of the expanded sheet as measured at this point of time was about 66%, and the thickness of the film was 0.85 mm. The results are shown in Table 2.

Comparative Example 2

Into 100 parts by weight of fine PTFE powder (F104, product of Daikin Chemical Co., Ltd.), was incorporated 26 parts by weight of naphtha, and they were mixed. This mixture was left to stand for about 24 hours at 60° C. to get the respective components intimate with each other. The mixture was then compressed within a cylinder having an inner diameter of about 130 mm to preform the mixture. The resultant preform in the form of a column was charged into an extrusion cylinder having an inner diameter of 130 mm and extruded through a T-die into a sheet having a width of 150 mm and a thickness of 2 mm. The resultant sheet-like extrudate was rolled so as to give a rolling ratio of 1.6 and a film thickness of 1.25 mm.

The rolled sheet obtained above was stretched at a draw ratio of 3.00 times at 200° C. in a lengthwise direction thereof and then at a draw ratio of 4.00 times at 200° C. in a crosswise direction thereof. The total draw ratio was 12.00 times. The resultant expanded sheet was passed through an oven, the atmosphere in which was 350° C., to sinter it. The porosity of the expanded sheet as measured at this point of time was about 66%, and the thickness of the film was 0.85 mm. After the film was air-cooled, the expanded sheet was compressed (compression ratio: 1.5) by means of a rolling mill so as to give a film thickness of about 0.58 mm. The porosity of the thus-obtained expanded porous PTFE film was about 50%. The results are shown in Table 2.

Comparative Example 3

Into 100 parts by weight of fine PTFE powder (F104, product of Daikin Chemical Co., Ltd.), was incorporated 26 parts by weight of naphtha, and they were mixed. This mixture was left to stand for about 24 hours at 60° C. to get the respective components intimate with each other. The mixture was then compressed within a cylinder having an inner diameter of about 130 mm to preform the mixture. The resultant preform in the form of a column was charged into an extrusion cylinder having an inner diameter of 130 mm and extruded through a T-die into a sheet having a width of 150 mm and a thickness of 2 mm. The resultant sheet-like extrudate was rolled so as to give a rolling ratio of 2.0 and a film thickness of 1.00 mm.

The rolled sheet obtained above was stretched at a draw ratio of 2.25 times at 200° C. in a lengthwise direction thereof and then at a draw ratio of 11.0 times at 200° C. in a crosswise direction thereof. The total draw ratio was 24.75 times. The resultant expanded sheet was passed through an oven, the atmosphere in which was 350° C., to sinter it. The porosity of the expanded sheet as measured at this point of time was about 72%, and the thickness of the film was 0.18 mm. The results are shown in Table 2.

TABLE 1

|  | Ex. 1 | Ex. 2 | Ex. 3 | Ex. 4 | Ex. 5 | Ex. 6 |
|---|---|---|---|---|---|---|
| Rolled sheet |  |  |  |  |  |  |
| Thickness (mm) | 0.50 | 0.75 | 1.00 | 1.00 | 1.00 | 1.00 |
| Rolling ratio | 4.0 | 2.7 | 2.0 | 2.0 | 2.0 | 2.0 |
| Draw ratio |  |  |  |  |  |  |
| Lengthwise draw ratio/crosswise draw ratio | 2.25/11.0 | 2.25/11.0 | 2.25/11.0 | 2.25/11.0 | 2.25/11.0 | 2.25/11.0 |
| Total draw ratio | 24.75 | 24.75 | 24.75 | 24.75 | 24.75 | 24.75 |
| Number of layers laminated | 1 | 1 | 1 | 1 | 6 | 6 |
| Cooling method after sintering | Air-cooled | Air-cooled | Air-cooled | Air-cooled | Air-cooled | Forcedly quenched |
| Film thickness after sintering (mm) | 0.08 | 0.12 | 0.18 | 0.18 | 1.05 | 1.05 |
| Porosity after sintering (%) | 72 | 72 | 72 | 72 | 72 | 72 |

TABLE 1-continued

|  | Ex. 1 | Ex. 2 | Ex. 3 | Ex. 4 | Ex. 5 | Ex. 6 |
|---|---|---|---|---|---|---|
| After compression | | | | | | |
| Film thickness (mm) | 0.04 | 0.07 | 0.15 | 0.10 | 0.60 | 0.60 |
| Compression ratio | 2.0 | 1.7 | 1.2 | 1.8 | 1.8 | 1.8 |
| Porosity after compression (%) | 50 | 50 | 65 | 50 | 50 | 50 |
| Tangent modulus | | | | | | |
| Average value (gf/mm$^2$) | 2093 | 2754 | 1139 | 2557 | 2274 | 2454 |
| Variation (CV value) (%) | 1.5 | 3.6 | 4.1 | 3.8 | 2.9 | 4.5 |
| Residual strain after applying 20% compression load 20 times | 6.5 | 8.5 | 10.5 | 7.0 | 9.0 | 4.0 |

TABLE 2

|  | Ex. 7 | Ex. 8 | Comp. Ex. 1 | Comp. Ex. 2 | Comp. Ex. 3 |
|---|---|---|---|---|---|
| Rolled sheet | | | | | |
| Thickness (mm) | 1.25 | 1.50 | 1.24 | 1.25 | 1.00 |
| Rolling ratio | 1.6 | 1.3 | 1.6 | 1.6 | 2.0 |
| Draw ratio | | | | | |
| Lengthwise draw ratio/crosswise draw ratio | 2.25/11.0 | 2.25/11.0 | 3.00/4.00 | 3.00/4.00 | 2.25/11.0 |
| Total draw ratio | 24.75 | 24.75 | 12.00 | 12.00 | 24.75 |
| Number of layers laminated | 1 | 1 | 1 | 1 | 1 |
| Cooling method after sintering | Air-cooled | Air-cooled | Air-cooled | Air-cooled | Air-cooled |
| Film thickness after sintering (mm) | 0.26 | 0.28 | 0.85 | 0.85 | 0.18 |
| Porosity after sintering (%) | 72 | 72 | 66 | 66 | 72 |
| After compression | | | | | |
| Film thickness (mm) | 0.15 | 0.16 | Not compressed | 0.58 | Not compressed |
| Compression ratio | 1.7 | 1.8 | | 1.5 | |
| Porosity after compression (%) | 50 | 50 | — | 50 | — |
| Tangent modulus | | | | | |
| Average value (gf/mm$^2$) | 1784 | 2099 | 598 | 3851 | 136 |
| Variation (CV value) (%) | 7.6 | 8.4 | 3.2 | 16.4 | 2.0 |
| Residual strain after applying 20% compression load 20 times | 7.5 | 8.0 | 15.5 | 14.4 | 15.0 |

<Consideration>

The expanded porous PTFE films of Examples 1 to 6, in which the rolling ratio was at least 2.0, and the total draw ratio was high, and which were obtained by conducting compression (re-rolling) after sintering, were such that the variation of the tangent modulus was as little as at most 7.0%, further at most 5.0%, and the residual strain was at most 10.5%, and exhibited excellent elastic recovery property in the thickness-wise direction of the film.

When Example 5 and Example 6 were compared with each other, the expanded porous PTFE film of Example 6 obtained by forcedly quenching the expanded film was smaller in residual strain, and thus had better elastic recovery property.

With respect to the expanded porous PTFE films of Examples 7 and 8, the residual strain was as small as at most 10.0%, and so the elastic recovery property in the thickness-wise direction of the film was good. However, the variation of the tangent modulus exceeded 5.0%, further 7.0%, and so the films were somewhat poor in even elastic recovery property compared with those of Examples 1 to 6. This is considered to be attributable to the fact that the rolling ratio is lower than 2.0.

On the other hand, the expanded porous PTFE film of Comparative Example 1 was great in residual strain and poor in elastic recovery property in the thickness-wise direction of the film because the total draw ratio was 12.00 times, and no compression step was provided.

The expanded porous PTFE film of Comparative Example 2 was that obtained by adding the compression step after the stretching step. However, residual strain could not be made sufficiently small, and the variation of tangent modulus was also great because the total draw ratio was 12.00 times.

The expanded porous PTFE film of Comparative Example 3 was that obtained by raising the total draw ratio to 24.75 times. However, residual strain was great, and elastic recovery property in the thickness-wise direction of the film was also poor because no compression step was provided.

Industrial Applicability

The expanded porous PTFE films according to the present invention can be suitably used as cushioning materials, sealing materials, semiconductor-packaging members, members for inspection of semiconductors, medical implanting material, and the like making good use of their properties such as heat resistance, chemical resistance and elastic recovery property.

The invention claimed is:

1. A process for producing an expanded porous polytetrafluoroethylene film having a microstructure composed of fine fibrils and nodes connected by the fibrils and having a porosity of 40 to 75%, the process comprising the following steps 1 to 6:

(1) an extrusion step 1 of extruding a mixture of unsintered polytetrafluoroethylene powder and a lubricant to prepare an extrudate in the form of a sheet or rod;

(2) a rolling step 2 of rolling the extrudate to prepare a rolled sheet;

(3) a stretching step 3 of biaxially stretching the rolled sheet in lengthwise and crosswise directions at a total draw ratio being 20 times to 40 times to prepare an expanded porous polytetrafluoroethylene film (A);

(4) a sintering step 4 of heating the expanded porous polytetrafluoroethylene film (A) having a porosity of at least 66% to a temperature not lower than the melting point of polytetrafluoroethylene in a state fixed so as not to shrink the film to sinter the film;

(5) a cooling step 5 of cooling the sintered expanded porous polytetrafluoroethylene film (A) to room temperature of 10° C. to 30° C.; and (6) a re-rolling step 6 of compressing the cooled expanded porous polytetrafluoroethylene film (A) in a thickness-wise direction of the film at a compression ratio of 1.1 to 4.0 to form an expanded porous polytetrafluoroethylene film (B) having a porosity of 40 to 75% and elastic recovery property in the thickness-wise direction of the film.

2. The production process according to claim 1, wherein in the rolling step 2, a sheet-like extrudate is rolled to a rolling ratio of at least 1.3 times.

3. The production process according to claim 1, wherein in the cooling step 5, the sintered expanded porous polytetrafluoroethylene film (A) is air-cooled at ambient temperature or quenched by blowing a cooling medium against the film.

4. The production process according to claim 1, wherein after the re-rolling step 6, an expanded porous polytetrafluoroethylene film (B) having residual strain of at most 11.0% as measured after a load required to indent a rod, which is in a columnar form that its outer diameter is at least 2 mm and at least 1.9 times as much as the thickness of the film, and has a smooth plane perpendicular to its axis at a free end surface thereof and a modulus of longitudinal elasticity of at least $1.0 \times 10^4$ kgf/mm$^2$, up to 20% of the film thickness at a strain rate of 100%/min from the free end surface is applied repeatedly 20 times is obtained.

5. A process for producing an expanded porous polytetrafluoroethylene film having a microstructure composed of fine fibrils and nodes connected by the fibrils and having a porosity of 40 to 75%, the process comprising the following steps I to VII:

(1) an extrusion step 1 of extruding a mixture of unsintered polytetrafluoroethylene powder and a lubricant to prepare an extrudate in the form of a sheet or rod;

(2) a rolling step II of rolling the extrudate to prepare a rolled sheet;

(3) a stretching step III of biaxially stretching the rolled sheet in lengthwise and crosswise directions at a total draw ratio being at least 20 times to 40 times to prepare an expanded porous polytetrafluoroethylene film (A);

(4) a multi-layer film-forming step IV of laminating at least two expanded porous polytetrafluoroethylene films (A) to prepare a multi-layer film (A1);

(5) a sintering step V of heating the multi-layer film (A1)) to a temperature not lower than the melting point of polytetrafluoroethylene in a state fixed so as not to shrink all the layers to sinter the film, and at the same time integrally fusion-bond the respective layers to each other to prepare an expanded porous polytetrafluoroethylene film (A2) having a porosity of at least 66%;

(6) a cooling step VI of cooling the sintered expanded porous polytetrafluoroethylene film (A2) to room temperature of 10° C. to 30° C.; and (7) a re-rolling step VII of compressing the cooled expanded porous polytetrafluoroethylene film (A2) in a thickness-wise direction of the film at a compression ratio of 1.1 to 4.0, thereby obtaining to form an expanded porous polytetrafluoroethylene film (B1) having a porosity of 40 to 75% and elastic recovery property in the thickness-wise direction of the film.

6. The production process according to claim 5, wherein in the rolling step II, a sheet-like extrudate is rolled to a rolling ratio of at least 1.3 times.

7. The production process according to claim 5, wherein in the cooling step VI, the sintered expanded porous polytetrafluoroethylene film (A2) is air-cooled at ambient temperature or quenched by blowing a cooling medium against the film.

8. The production process according to claim 5, wherein after the re-rolling step VII, an expanded porous polytetrafluoroethylene film (B1) having residual strain of at most 11.0% as measured after a load required to indent a rod, which is in a columnar form that its outer diameter is at least 2 mm and at least 1.9 times as much as the thickness of the film, and has a smooth plane perpendicular to its axis at a free end surface thereof and a modulus of longitudinal elasticity of at least $1.0 \times 10^4$ kgf/mm$^2$, up to 20% of the film thickness at a strain rate of 100%/min from the free end surface is applied repeatedly 20 times is obtained.

* * * * *